(12) United States Patent
Bodin

(10) Patent No.: US 6,722,205 B2
(45) Date of Patent: Apr. 20, 2004

(54) UNITARY PRESSURE SENSOR HOUSING AND ASSEMBLY

(75) Inventor: Joel J. Bodin, Chanhassen, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/178,091

(22) Filed: Jun. 24, 2002

(65) Prior Publication Data

US 2003/0233884 A1 Dec. 25, 2003

(51) Int. Cl.⁷ .................................................. G01L 7/00
(52) U.S. Cl. ......................................................... 73/756
(58) Field of Search ......................... 73/706, 715–727, 73/756; 361/283.1–283.4

(56) References Cited

U.S. PATENT DOCUMENTS

| | | | |
|---|---|---|---|
| 4,019,388 A | | 4/1977 | Hall, II et al. ................. 73/398 |
| 4,653,330 A | * | 3/1987 | Hedtke ......................... 73/756 |
| 4,655,088 A | * | 4/1987 | Adams ......................... 73/756 |
| 5,287,746 A | | 2/1994 | Broden ......................... 73/706 |
| 5,465,626 A | * | 11/1995 | Brown et al. ................... 73/715 |
| 5,648,615 A | * | 7/1997 | Jeske et al. .................... 73/756 |
| 6,105,436 A | * | 8/2000 | Lischer et al. ................. 73/724 |

FOREIGN PATENT DOCUMENTS

| | | |
|---|---|---|
| DE | 43 17312 | 12/1994 |
| DE | 197 35 892 | 11/1998 |

OTHER PUBLICATIONS

International Searching Authority, *Notification of Transmittal of the International Search Report or the Declaration*, pp. 1–6 (2003).

* cited by examiner

*Primary Examiner*—William Oen
(74) *Attorney, Agent, or Firm*—McDonnell Boehnen Hulbert & Berghoff LLP

(57) ABSTRACT

A pressure sensor housing and assembly is disclosed. The pressure sensor may have a manifold and a header comprising one integral unitary housing. The unitary housing may have a pressure inlet in communication with an elongated tube. The unitary housing also may have a sensing die coupled to the elongated tube in order to receive pressure input signals through the pressure inlet. The sensing die may detect an applied pressure and derive an electrical signal from the applied pressure.

20 Claims, 3 Drawing Sheets ive pressurepress
UNITARY PRESSURE SENSOR HOUSING AND ASSEMBLY

BACKGROUND

A. Field of Invention

The present invention relates in general to sensors, and more particularly, to a pressure sensor housing and assembly.

B. Description of Related Art

Pressure measurements are generally made in process control industries (e.g., paper manufacturer, oil refinery, chemicals manufacturer, etc.), in vehicles (e.g., oil pressure in an engine), in aerospace manufacturing, in utilities and heating, and in other industries. Pressure measurements typically are made as absolute, gauge, or differential measurements. Absolute pressure sensors measure a pressure relative to a vacuum, gauge sensors measure a pressure relative to atmospheric pressure, and differential sensors measure a pressure difference between two inputs.

Pressure sensors may incorporate an "up-the-tube" pressure intake design to possibly accommodate differential, gauge, and absolute pressure measurements. An up-the-tube pressure sensor may be able to measure a pressure without harm to components of the sensor. For example, an up-the-tube pressure sensor may prevent fluid from contacting electronics of a sensing die. A typical up-the-tube pressure sensor has a glass header connected (via a laser-weld) to a manifold. Additionally, a printed circuit board is connected upright to the glass header using a flexible printed circuit board bond (i.e., flex-tape). Manufacturing a pressure sensor in this manner reduces the amount of space on the circuit board due to the header laser-weld and the header flex-tape bond because both the laser-weld and the flex-tape connections utilize circuit board real estate.

In addition, existing up-the-tube pressure sensors are configured such that pressure inputs and electrical outputs flow in opposing directions, causing interference between the inputs and outputs of the sensor. As a result, existing up-the-tube pressure sensors may not fulfill manufacturing and performance requirements, and so, a pressure sensor that may be manufactured without such existing difficulties and problems is desired.

SUMMARY OF THE INVENTION

In accordance with an exemplary embodiment, a unitary housing is provided that has a pressure inlet that is defined through a surface of the unitary housing. The housing also has an elongated tube positioned within the unitary housing. The elongated tube has a first end and a second end. The first end is in pressure communication with the pressure inlet. The housing also has a sensing die attached to the second end of the elongated tube such that pressure present at the pressure inlet is measurable by the sensing die.

In another embodiment, a pressure sensor assembly is provided that has a unitary housing with a first end and a second end. The first end has a surface with a pressure inlet that comprises an elongated tube. The assembly also has a sensing die with a pressure sensitive surface. The sensing die is coupled to the elongated tube and mounted such that the pressure sensitive surface is substantially perpendicular to the surface of the housing with the pressure inlet. The assembly also has a circuit board coupled to the second end of the unitary housing such that the circuit board is substantially perpendicular to the surface of the housing with the pressure inlet.

In still another embodiment, an up-the-tube pressure sensor is provided that has a unitary housing comprising a pressure inlet that is defined through a surface of the unitary housing. The housing also has a sensing die positioned within the unitary housing. The sensing die is in pressure communication with the pressure inlet. The housing further has an elongated Pyrex tube positioned within the unitary housing. The elongated Pyrex tube is in pressure communication with the pressure inlet.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

In an exemplary embodiment, an up-the-tube pressure sensor assembly is presented. The assembly may have a unitary housing that comprises a manifold and a header, which is connected to a circuit board. The unitary housing may eliminate flex-tape bonds or laser-weld joints as in existing up-the-tube pressure sensors in order to increase circuit board space as compared to the existing pressure sensor assemblies. The up-the-tube pressure sensor also isolates the electronics side of a sensing die from process fluid input signals. Therefore, the process fluid input signals may not interfere with electrical output signals using such a configuration.

Figure 1:
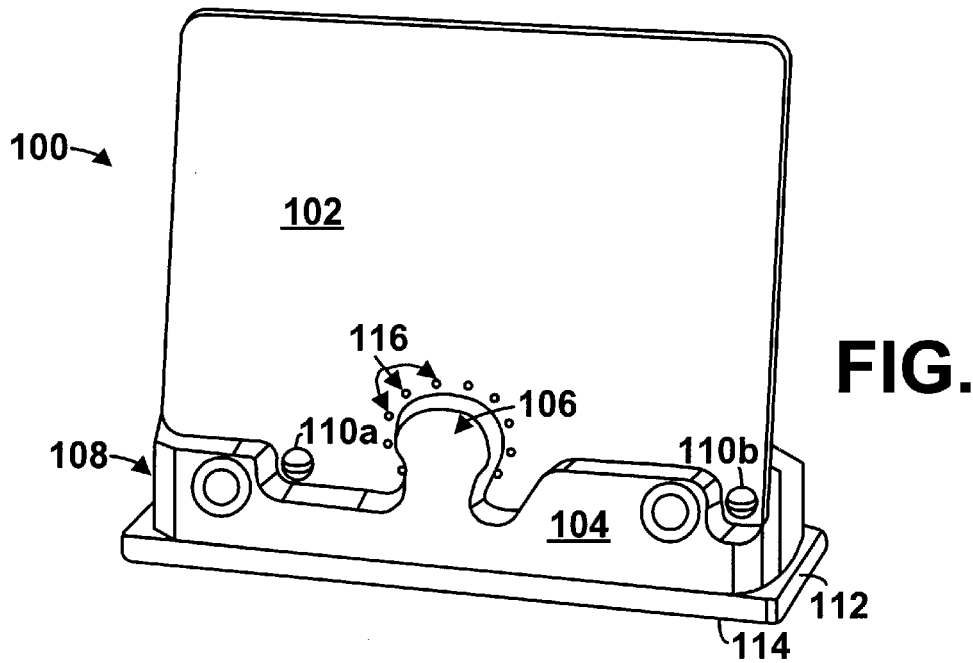
FIG. 1 illustrates a back view of one embodiment of a pressure sensor assembly.

Referring to FIG. 1, one embodiment of a pressure sensor assembly 100 is illustrated. The pressure sensor assembly 100 has a printed circuit board 102, a manifold 104 and a header 106. The manifold 104 and header 106 may comprise one integral unitary pressure sensor housing 108. In another embodiment, the manifold 104 and the header 106 may be separate pieces attached or welded together to form the unitary housing 108. The printed circuit board 102 may be attached to the unitary housing 108 using screws 110(a–b) or their equivalent. The unitary housing 108 has a base 112, the surface 114 of which has an opening to admit pressure signals being measured (the opening is not shown in FIG. 1 for ease of illustration). The unitary housing 108 also has leads (not shown in FIG. 1) which pass through the printed circuit board 102. Solder joints 116 conductively couple the leads to the printed circuit board 102. The printed circuit board 102 may be mounted to the unitary housing 108 so that it is perpendicular to the surface 114 of the base 112 (i.e., in an upright position relative to the unitary housing 108).

The base 112 of the unitary housing 108 may be a substantially planar mounting surface that enables the unitary housing 108 to be mounted to any substantially flat surface. The unitary housing 108 may comprise a stainless steel material, although other materials are possible.

The pressure sensor assembly 100 includes the header 106 arranged substantially perpendicular to the manifold 104. By integrating the header 106 and the manifold 104 into one unitary housing 108 and rotating the header 106 approximately 90° from the manifold 104, several advantages in assembly and parts may be realized. For example, integrating the header 106 and manifold 104 eliminates attaching the header 106 and manifold 104 together, which may eliminate manufacturing steps and additional parts, such as a laser-weld joint. Additionally, rotating the header 106 to be substantially perpendicular to the manifold 104 allows the printed circuit board 102 to be soldered directly to the header 106, which may eliminate additional manufacturing and processing steps such as a separate flex-tape connection or supplementary connectors. Furthermore, an increased area on the printed circuit board 102 may be available due to the configuration of the pressure sensor assembly 100.

Figure 2:
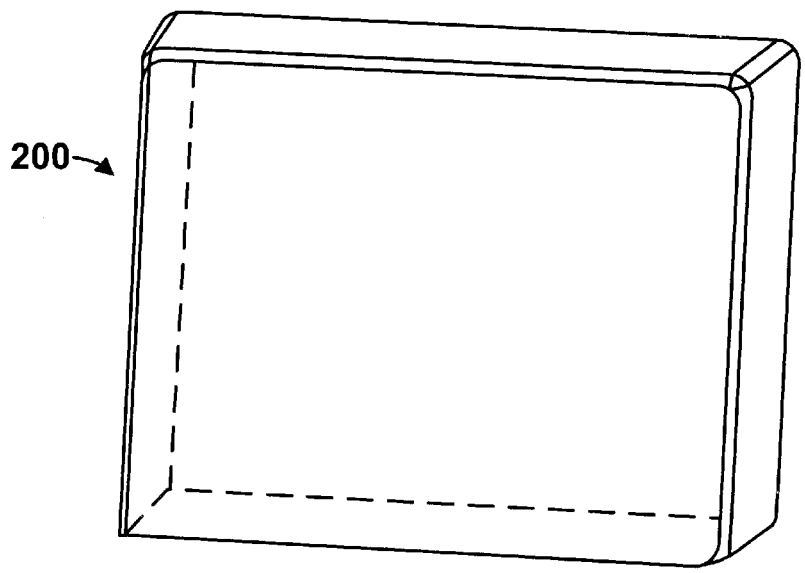
FIG. 2 illustrates a cover for the pressure sensor assembly of FIG. 1.

Referring to FIG. 2, a cover 200 for the pressure sensor assembly 100 of FIG. 1 is illustrated. Cover 200 may be comprised of steel, metal, ceramic, etc., and can protect the pressure sensor assembly 100 from harsh environments. The cover 200 may slide over the printed circuit board 102 and the unitary housing 108 to enclose and protect them both. The cover 200 may attach to the pressure sensor assembly 100 at the base 112 of the unitary housing 108 by a friction fit, snap-fit, screws, or other means. The enclosure of pressure sensor assembly 100 using cover 200 may provide a sealed package for pressure sensor assembly 100. The sealed package may reduce humidity or moisture effects on the printed circuit board 102 or other electronics of the pressure sensor assembly 100.

Figure 3A:
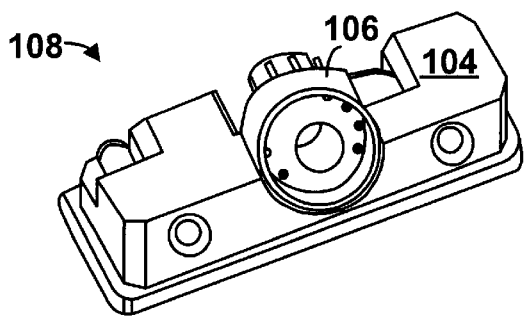
FIGS. 3A–3B illustrate front and back isometric views of a portion of the pressure sensor assembly of FIG. 1.
Figure 3B:
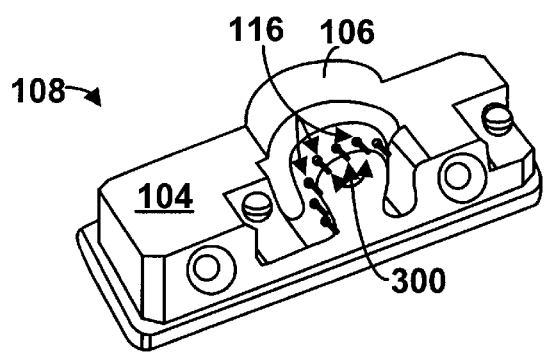

FIG. 3A illustrates a front isometric view of the unitary housing 108. FIG. 3B illustrates a back isometric sectional view of the unitary housing 108. As shown in FIG. 3B, the header 106 includes pins 300 to attach to the printed circuit board 102. The pins 300 are arranged within corresponding openings of the printed circuit board 102 and may be soldered to the printed circuit board 102. The pins 300 may be small wires. Although only seven pins 300 are shown in FIG. 3B for ease of illustration, any desirable number of pins may be used. Furthermore, the pins 300 may be arranged or located in different positions on the header 106 according to a desired mounting of the printed circuit board 102.

Figure 3C:
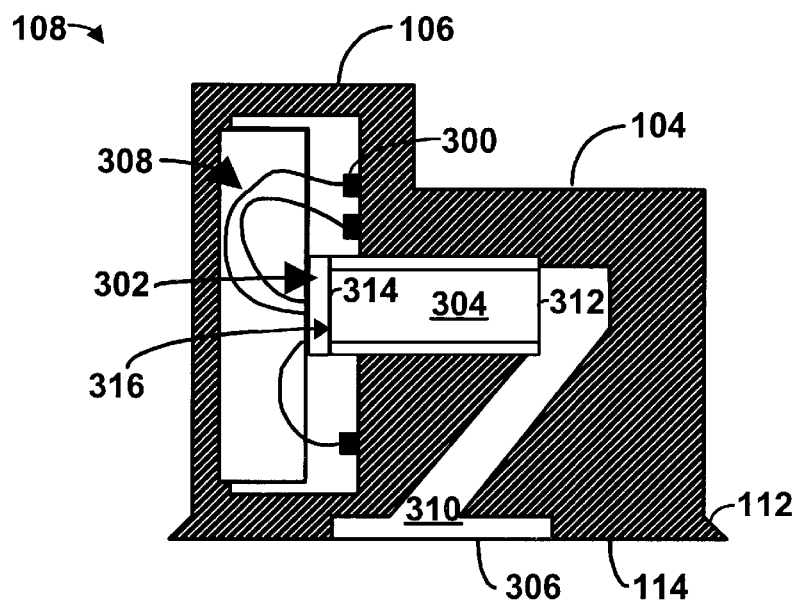
FIG. 3C illustrates a cross-sectional view of a portion of the pressure sensor assembly of FIG. 1.

FIG. 3C is a cross-sectional view of the unitary housing 108. The unitary housing 108 may have a sensing die 302, an elongated tube 304, a pressure inlet 306 within the base 112, and multiple connecting leads 308. The elongated tube 304 is positioned within a cavity 310 of the unitary housing 108. The elongated tube 304 may be a cylindrical tube with openings on both ends, although other configurations are possible. The elongated tube 304 may be angularly mounted with respect to the base 112 of the unitary housing 108 with the pressure inlet 306. For example, as illustrated in FIG. 3C, the cylindrical portion of the elongated tube 304 is mounted parallel to the base 112 of the unitary housing 108. However, the elongated tube 304 may be mounted in other arrangements as well. The elongated tube 304 may be epoxied within the cavity 310 or it may be soldered into place.

One end 312 of the elongated tube 304 is in communication with the pressure inlet 306. The sensing die 302 is connected to the other end 314 of the elongated tube 304. The sensing die 302 senses pressure at surface 316 and produces an electrical signal proportional to the pressure. An input pressure applied to the sensing die 302 is transmitted through the pressure inlet 306 and through the elongated tube 304, where it reaches surface 316 of sensing die 302. The input pressure may be applied by a liquid or a gas.

The sensing die 302 may include a flexible diaphragm with strain gauges either bonded to the diaphragm, or diffused into the diaphragm, performing as resistive elements. Under a pressure-induced strain, the resistive values of the strain gauges change, and this resistive change can be converted to an electrical output proportional to the input pressure using appropriate circuitry. The sensing die 302 may also include a capacitive sensor in which a pressure diaphragm is one plate of a capacitor, the value of which changes due to a pressure-induced displacement. The sensing die 302 may also be a piezoresistive pressure sensor, or silicon cell. A piezoresistive pressure sensor has a diaphragm with piezoresistive strain gauges diffused into the sensing die 302. By measuring a voltage on the piezoresistive strain gauges, a pressure applied to the diaphragm may be determined. Still other variations of the sensing die 302 are possible as well.

The sensing die 302 generally measures a difference in pressure between two sides of the diaphragm. Thus, sensing die 302 may be able to measure absolute, differential, or gauge pressure, as required.

The elongated tube 304 may be comprised of Pyrex, or other materials that have a coefficient of thermal expansion that is about the same as that of the sensing die 302. This may reduce and/or prevent temperature-induced variations in signal outputs caused by using materials for the sensing die 302 and the elongated tube 304 that have different thermal coefficients of expansion. For example, since the sensing die 302 may be rigidly attached to the elongated tube 304, temperature-induced error in pressure measurements may arise due to an imbalance of coefficients of thermal expansion.

Connecting leads 308 extend from the sensing die 302 to the pins 300. The connecting leads 308 may be wire-bonded to the sensing die 302, or connected through other means and soldered to the pins 300.

Figure 4:
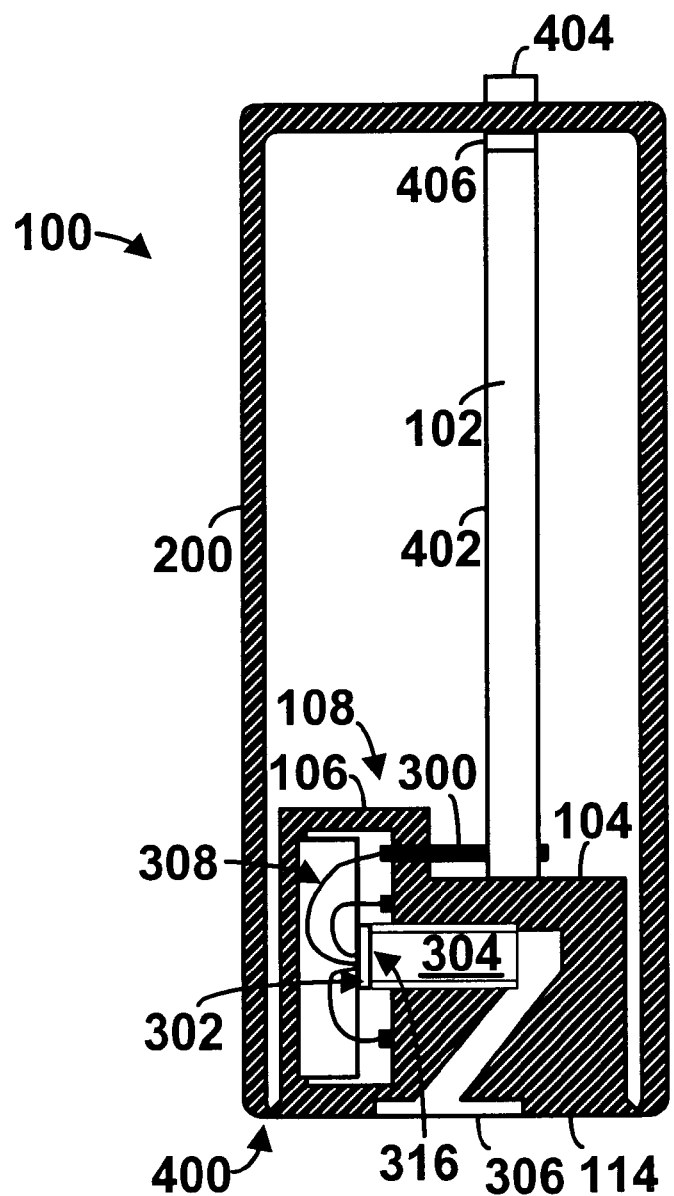
FIG. 4 illustrates a cross-sectional view of the pressure sensor assembly of FIG. 1 and the cover of FIG. 2.

FIG. 4 is a cross-sectional view of the pressure sensor assembly 100 of FIG. 1 with the cover 200 attached. The surface 114 of the unitary housing 108 and the cover 200 form a seal 400. As shown, surface 316 of the sensing die 302 is substantially parallel to the printed circuit board 102 and is also substantially perpendicular to the surface 114 of the unitary housing 108. Additionally, the surface 114 is substantially perpendicular to surface 402 of the printed circuit board 102. Perpendicular or parallel relationships between the elements described are not critical to all embodiments of the invention, however, as other arrangements may still achieve the advantages of the invention.

FIG. 4 also illustrates an output port 404 of the printed circuit board 102. The output port 404 may be conductively coupled to an end 406 of the printed circuit board 102 opposite the unitary housing 108. However, the output port 404 may also be elsewhere on the pressure sensor assembly 100.

It should be understood that the pressure sensor assembly 100 illustrated in FIGS. 1–4 and other arrangements described herein are set forth for purposes of example only, and other arrangements and elements can be used instead and some elements may be omitted altogether. For example, the selection of materials for use in the pressure sensor assembly 100 may be chosen to withstand high pressures, temperatures, or other environmental conditions.

The pressure sensor assembly 100 illustrated in FIGS. 1–4 may be employed as an up-the-tube pressure sensor assembly. However, those skilled in the art will recognize that the pressure sensor assembly 100 may be used in accordance with other pressure sensing techniques also.

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention. Other examples are possible as well.

I claim:

1. A pressure sensor comprising:

an integral unitary housing;

a pressure inlet defined through a surface of the integral unitary housing;

an elongated tube positioned within the integral unitary housing, the elongated tube having a first end and a second end, the first end being in pressure communication with the pressure inlet; and a sensing die attached to the second end of the elongated tube, whereby pressure present at the pressure inlet is measurable by the sensing die.

2. The pressure sensor of claim 1, wherein the integral unitary housing comprises a manifold and a header.

3. The pressure sensor of claim 1, wherein the elongated tube comprises a material having a coefficient of thermal expansion substantially the same as the sensing die.

4. The pressure sensor of claim 1, wherein the sensing die has a pressure sensitive surface, and wherein the sensing die is attached to the second end of the elongated tube such that the pressure sensitive surface is perpendicular to the surface through which the pressure inlet is defined.

5. The pressure sensor of claim 1, further comprising a cover sealingly attached to the integral unitary housing.

6. The pressure sensor of claim 1, wherein the elongated tube has a low coefficient of thermal expansion.

7. The pressure sensor of claim 1, wherein the elongated tube is angularly positioned within the integral unitary housing.

8. The pressure sensor of claim 1, wherein the elongated tube is cylindrical.

9. The pressure sensor of claim 1, wherein the elongated tube is a Pyrex® tube.

10. The pressure sensor of claim 1, wherein the surface of the integral unitary housing through which the pressure inlet is defined is a substantially planar mounting surface.

11. The pressure sensor of claim 10, wherein the elongated tube is positioned to be substantially parallel to the planar mounting surface.

12. A pressure sensor assembly comprising:

a unitary housing having a first end and a second end, the first end having a surface with a pressure inlet, the pressure inlet comprising an elongated tube;

a sensing die having a pressure sensitive surface, the sensing die coupled to the elongated tube and mounted such that the pressure sensitive surface is substantially perpendicular to the surface of the housing with the pressure inlet; and a circuit board coupled to the second end of the unitary housing such that the circuit board is substantially perpendicular to the surface of the housing with the pressure inlet.

13. The pressure sensor assembly of claim 12, wherein the sensing die has a coefficient of thermal expansion substantially the same as the elongated tube.

14. The pressure sensor assembly of claim 12, wherein the sensing die detects a pressure through the pressure inlet.

15. The pressure sensor assembly of claim 12, wherein the elongated tube is a Pyrex® tube.

16. The pressure sensor assembly of claim 12 further comprising a plurality of leads electrically coupling the circuit board to the sensing die.

17. The pressure sensor assembly of claim 12 further comprising a cover sealingly attached to the unitary housing.

18. A tubular intake pressure sensor comprising:

an integral unitary housing having;

a pressure inlet defined through a surface of the integral unitary housing;

a sensing die positioned within the integral unitary housing, the sensing die being in pressure communication with the pressure inlet; and an elongated Pyrex® tube positioned within the integral unitary housing, the elongated Pyrex® tube being in pressure communication with the pressure inlet.

19. The tubular intake pressure sensor of claim 18, wherein the sensing die comprises a material having a coefficient of thermal expansion substantially the same as the elongated Pyrex® tube.

20. The tubular intake pressure sensor of claim 18, wherein the integral unitary housing comprises a header and a manifold.

* * * * *